United States Patent [19]
Chen

[11] Patent Number: 5,564,480
[45] Date of Patent: Oct. 15, 1996

[54] VACUUM CANISTER

[76] Inventor: Chen-Hai Chen, 2 Fl., No. 6, Alley 27, Lane 55, Yuh Min Rd., Tuu Cherng, Taipei Hsien, Taiwan

[21] Appl. No.: 393,918

[22] Filed: Feb. 24, 1995

[51] Int. Cl.⁶ ................................................. B65D 51/00
[52] U.S. Cl. ........................... 141/65; 215/228; 215/270; 215/311; 220/203.11; 220/203.02; 220/231
[58] Field of Search ..................... 141/65, 95; 215/228, 215/260, 270, 311, 312, 315; 220/203.01, 203.02, 203.11, 203.13, 203.15, 203.16, 203.18, 203.29, 212, 231, 367.1, 368

[56] References Cited

U.S. PATENT DOCUMENTS

| | | | |
|---|---|---|---|
| 3,313,444 | 4/1967 | Katell | 141/65 X |
| 3,414,160 | 12/1968 | Weber | 141/65 |
| 3,570,704 | 3/1971 | Roson | 220/203.02 |
| 3,800,972 | 4/1974 | Raymond | 220/203.01 |
| 5,251,770 | 10/1993 | Bartley et al. | 215/270 |
| 5,405,038 | 4/1995 | Chuang | 220/231 |
| 5,406,992 | 4/1995 | Miramon | 141/65 |
| 5,449,079 | 9/1995 | Yang | 215/228 |

*Primary Examiner*—J. Casimer Jacyna
*Attorney, Agent, or Firm*—Browdy and Neimark

[57] ABSTRACT

A vacuum canister comprises a container and a lid which is provided with a large slot having centrally in the bottom thereof a retaining hole provided peripherally with ventilation holes. A soft disk member is provided such that a retaining column of the disk member is held in the retaining hole of the large slot of the lid, and that a disk portion of the disk member is located on the ventilation holes. The lid is further provided with a suction unit comprising a lever and a suction block. The lever is fastened pivotally at one end thereof to the lid and is provided on another end thereof with a hand grip. The suction block is fastened pivotally to the midsegment of the lever and is provided with a rod and a piston. The rod is pivoted to the lever while the piston is disposed slidably in the large slot of the lid. The piston is provided peripherally with a circular groove in which a sealing ring is received. The vacuum is created in the container by the suction block which is actuated by the motion of the lever.

3 Claims, 4 Drawing Sheets

VACUUM CANISTER

FIELD OF THE INVENTION

The present invention relates generally to a vacuum vessel, and more particularly to a vacuum canister.

BACKGROUND OF THE INVENTION

The foodstuffs, such as chocolate and peanut, are generally kept in the vacuum cans for keeping the original freshness and flavor of the foodstuffs. As shown in FIG. 1, a conventional vacuum can comprises a container 1 provided with a lid 2 having a plurality of ventilation holes 3 which are provided thereon with a disk piece 4 held on a cushioning piece 7 by means of a press button 5. The food is put into the container 1 before the lid 2 is joined with the container 1. The air in the container 1 is drawn out via the ventilation holes 3 by the suction force of a suction pump 6 located over the press button 5, so as to create a vacuum in the container 1. Such a prior art vacuum can as described above is defective in design in that the suction pump 6 is a separate entity and can be easily misplaced or lost. In addition, the suction pump 6 is not an efficient means for creating a vacuum in the container 1.

SUMMARY OF THE INVENTION

It is therefore the primary objective of the present invention to provide an improved vacuum canister which is provided integrally with a suction means capable of creating a vacuum in the can easily and rapidly.

The foregoing objective of the present invention is attained by an improved vacuum canister comprising a container and a lid which is provided with a large slot having centrally in the bottom thereof a retaining hole provided peripherally with at least one ventilation hole. A soft disk member is provided such that a retaining column of the disk member is held in the retaining hole, and that a disk portion of the disk member is located on the ventilation hole. The lid is further provided with a suction unit comprising a lever and a suction block. The lever is fastened pivotally at one end thereof to the lid and is provided on another end thereof with a hand grip. The suction block is fastened pivotally to the midsegment of the lever and is provided with a rod and a piston. The rod is pivoted to the lever while the piston is disposed slidably in the large slot. The piston is provided peripherally with a circular groove in which a sealing ring is received. The piston is further provided along the edge of the upper surface thereof with at least one indentation. The vacuum is created in the container by the suction block which is actuated by the motion of the lever.

The foregoing objective, features and advantages of the present invention will be more readily understood upon a thoughtful deliberation of the following detailed description of the present invention in conjunction with the accompanying drawings.

DETAILED DESCRIPTION OF THE INVENTION

Figure 1:
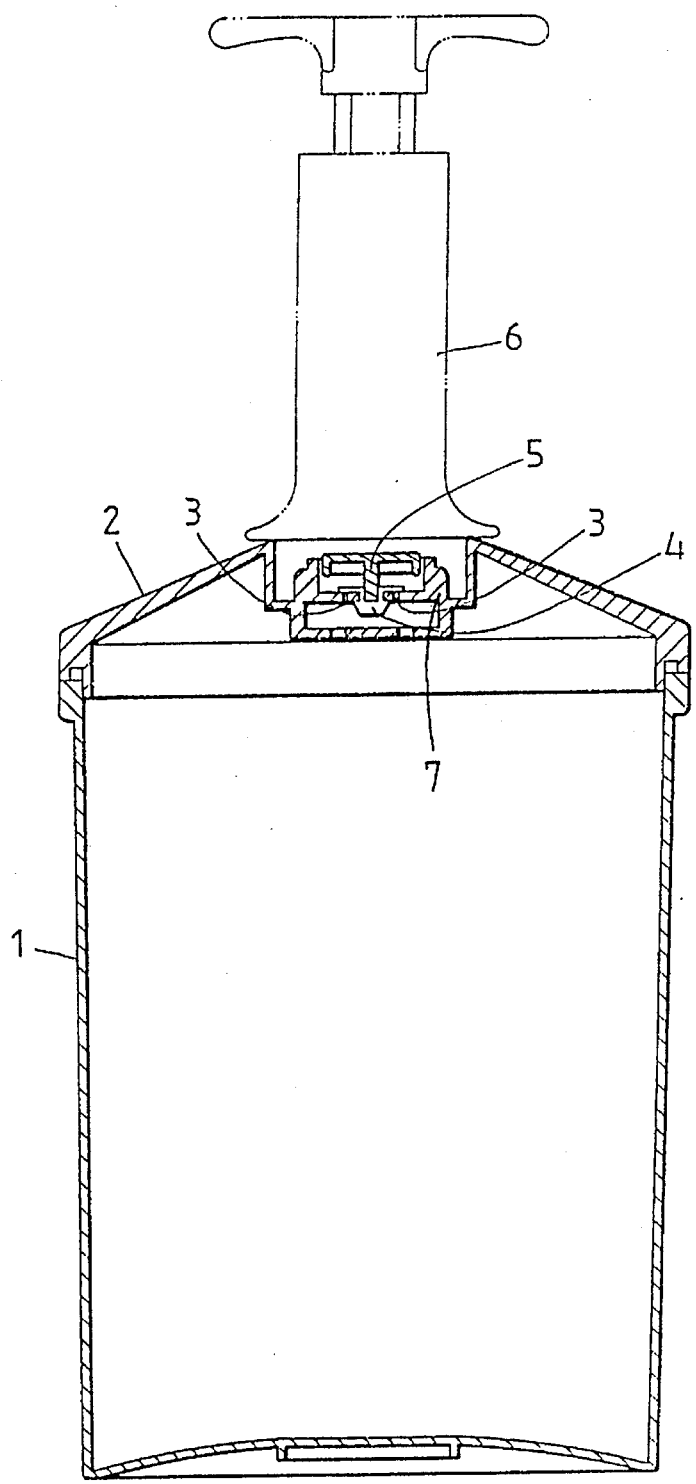
FIG. 1 shows a schematic view of a vacuum can of the prior art.
Figure 2:
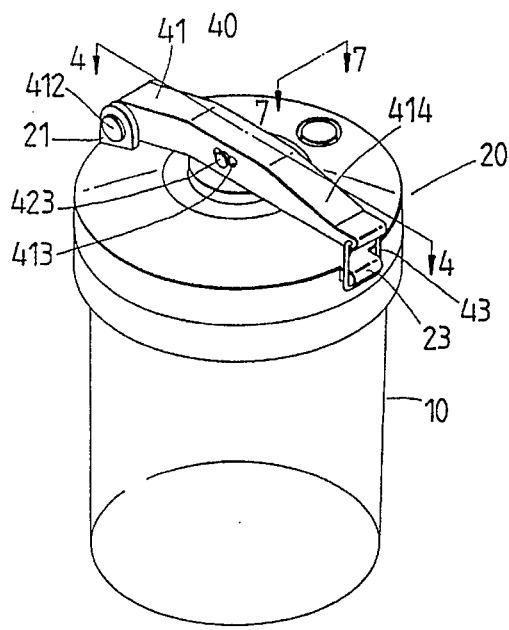
FIG. 2 shows a perspective view of a vacuum can of the present invention.
Figure 3:
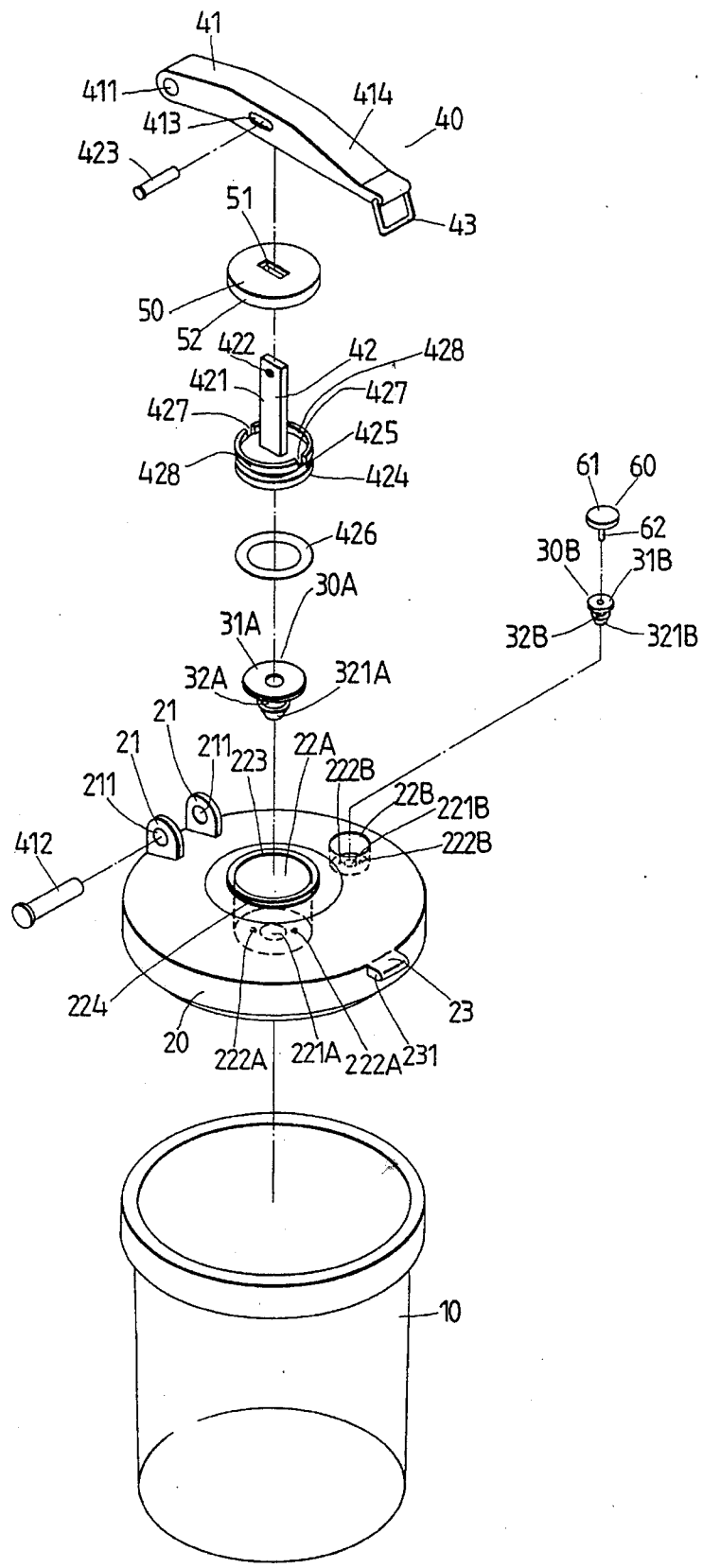
FIG. 3 shows an exploded view of the vacuum can as shown in FIG. 2.

As shown in FIGS. 2 and 3, an improved vacuum canister of the present invention comprises a container 10, a lid 20, two soft disk members 30, a suction unit 40, a sealing cover 50, and a press button 60.

The container 10 has an open top through which the food is put into the container 10.

The lid 20 is joined with the container 10 in an airtight manner and is provided radially in the upper surface thereof with two lugs 21, a large cavity 22A, a hooked block 23, and a small cavity 22B. The two lugs 21 are opposite in location to each other and are provided respectively with a pivoting hole 211. The large cavity 22A and the small cavity 22B are provided respectively in the bottom thereof with retaining holes 221A, 221B, which are provided peripherally and respectively with ventilation holes 222A, 222B for communicating the interior of container 10 with the large and the small cavities 22A and 22B. The large cavity 22A is provided peripherally on the top portion thereof with a circular wall 223. Circular wall 223 is further provided peripherally on its outer side thereof with male threads 224. The hooked block 23 is provided in the underside thereof with a shallow slot 231.

The two soft disk members 30A and 30B are made of a plastic material and are provided respectively with disk portions 31A, 31B. The two soft disk members 30A and 30B are provided centrally and respectively with retaining columns 32A, 32B, which have respectively at the front end thereof tapered heads 321A, 321B which are respectively engageable with the retaining holes 221A, 221B. The two disk portions 31A and 31B are disposed such that they are located respectively on the ventilation holes 222A, 222B.

The suction unit 40 has a lever 41 and a suction block 42. The lever 41 is provided at one end thereof with a pivoting hole 411 engageable with a pivot 412 by means of which the lever 41 is pivoted to the two lugs 21 of the lid 20. The lever 41 is provided at the midsegment thereof with a horizontal hole 413 and at another end thereof with a hand grip 414. The lever 41 is further provided at the edge of the hand grip 414 thereof with a hoop 43 capable of being located in the shallow slot 231 of the hooked block 23 of the lid 20. The suction block 42 comprises a rod 421 of a predetermined length and provided at one end thereof with a round hole 422 engageable with a round rod 423 which is inserted into the horizontal hole 413 of the lever 41. The suction block 42 further comprises a piston 424 corresponding in cross section to the large cavity 22A and slidable along the wall surface of the large cavity 22A. The piston 424 is provided peripherally with a circular groove 425 in which a sealing ring 426 is disposed. The sealing ring 426 has a thickness smaller than the depth of the circular groove 425. The piston 424 is further provided with two reinforcing pieces 428 extending upwardly having two indentations 427.

The sealing cover 50 is intended to seal off the large cavity 22A and is provided in the top thereof with a through hole 51 having a diameter greater than the diameter of the rod 421 of the suction block 42. The rod 42 is disposed slidably in the through hole 51. The sealing cover 50 is further provided with female threads 52 engageable with the male threads 224 of the circular wall 223 of the large cavity 22A.

The press button 60 has a press disk 61 and is disposed in the small cavity 22B of the lid 20. The press button 60 is provided under the press disk 61 with a press rod 62 urging the disk portion 31B of the disk member 30B.

Figure 4:
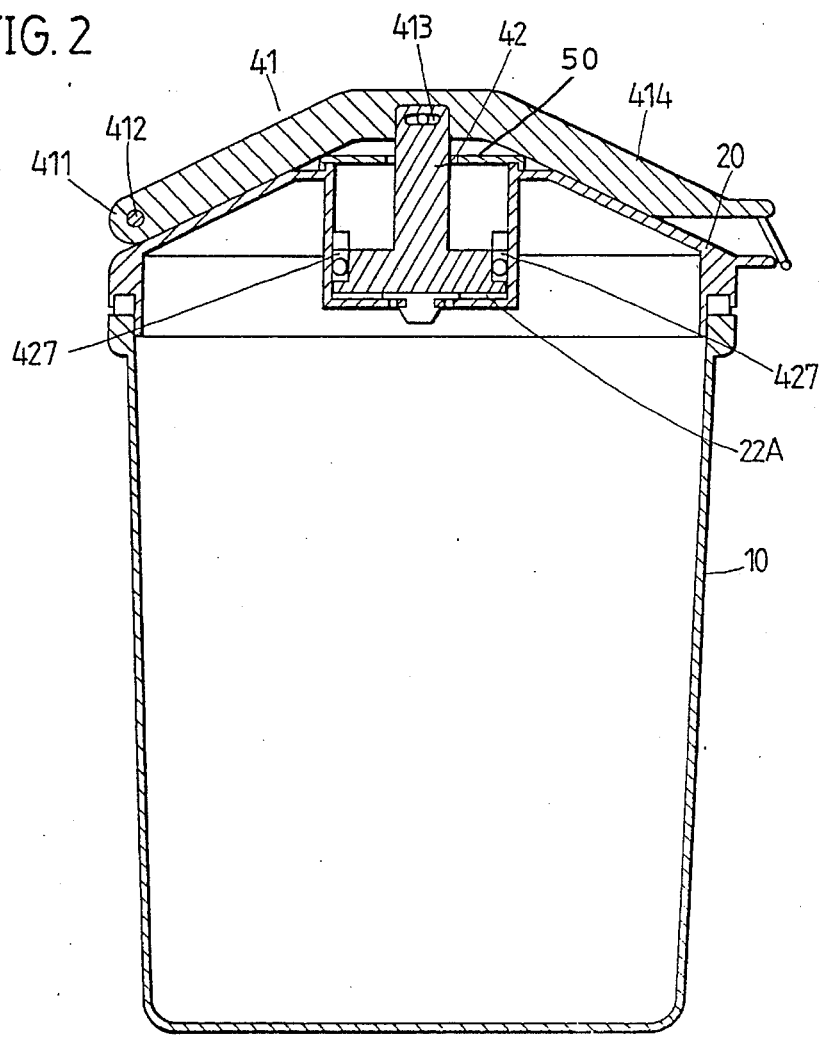
FIG. 4 shows a sectional view of a portion taken along the line 4—4 as shown in FIG. 2.
Figure 5:
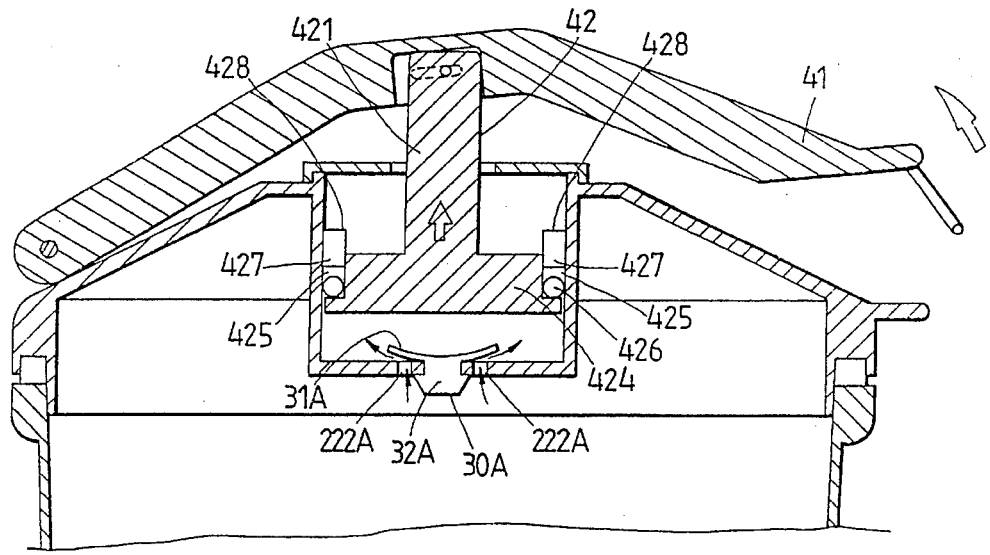
FIG. 5 is a partial enlarged view of the portion as shown in FIG. 4, showing that the suction unit of the vacuum can of the present invention is lifted.
Figure 6:
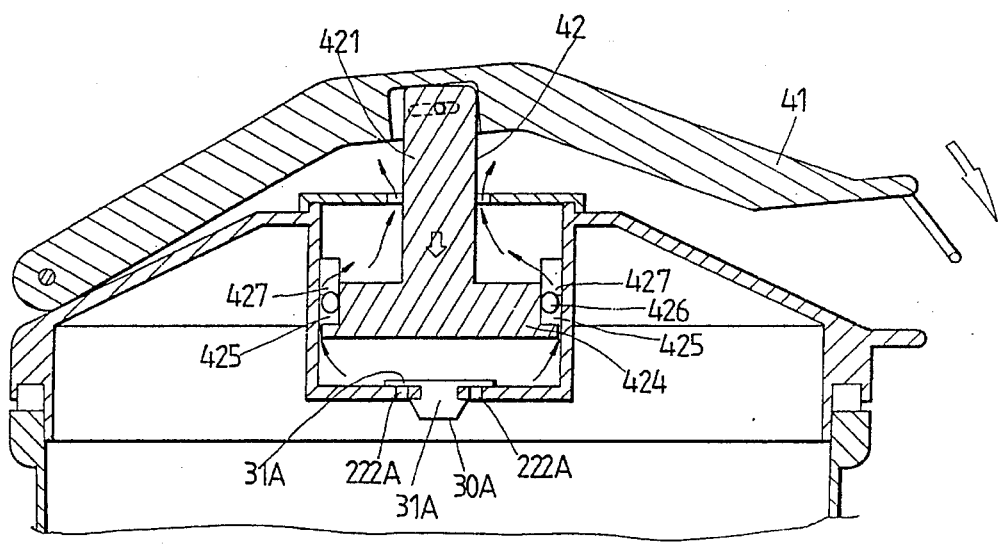
FIG. 6 is similar to FIG. 5, except that the suction unit is pressed in FIG. 6.

In operation, the hand grip 414 of the lever 41 of the suction unit 40 is moved up and down so as to actuate the suction block 42, thereby causing the air in the container 10 to be drawn out via the large cavity 22A. As shown in FIGS. 4–6, the food is put into the container 10 which is then joined with the lid 20. The air in the large cavity 22A is exhausted as shown in FIG. 5, when the hand grip 44 of the lever 41 is lifted to cause the suction block 42 to move upwards. When the upward movement of the suction block 42 takes place, the interior space of the large cavity 22A is enlarged so that the pressure in the large cavity 22A is lower. It must be noted here that the interior of the large cavity 22A is insulated from the atmospheric air by the sealing ring 426. The air pressure in the container 10 is greater than that in the large cavity 22A. As a result, the disk portion 31A of the disk member 30A is caused to deform so as to allow the air in the container 10 to flow into the large cavity 22A via the ventilation hole 222A. When the hand grip 414 of the lever 41 is pressed so as to actuate the suction block 42 to move downwards, the sealing ring 426 is forced to move into the indentation 427, as shown in FIG. 6. In the meantime, when the suction block 42 is caused to move downwards, the disk portion 31A of the disk member 30A is forced by the air to move downwards to cover the ventilation hole 222A, thereby bringing about the escape of the air in the interior of the large cavity 22A into the atmosphere via the gap of the piston 424. As the suction block 42 is caused to move downwards to reach the extreme bottom, the interior of the large cavity 22A is almost devoid of air. A vacuum can be created in the container 10 by lifting and pressing the lever 41 repeatedly. The lid 20 is therefore joined intimately with the container 10 by virtue of the fact that the atmospheric pressure is much greater than the pressure in the container 10.

Figure 7:
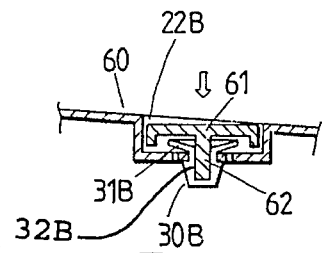
FIG. 7 shows a sectional view of a portion taken along the line 7—7 as shown in FIG. 2.

As shown in FIG. 7, the food contained in the container 10 can be taken out by pressing the press button 60 until such time when the center of the disk member 30B is caved in and the disk portion 31B is warped. As a result, the atmospheric air is allowed to enter the container 10 so as to equalize the pressures inside and outside the container 10. The lid 20 can be therefore removed from the open top of the container 10 so that a person can have an access to the food kept in the container 10.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A vacuum canister comprising:

a container having an open top;

a lid joined with said open top of said container and provided with a large cavity having centrally in a bottom thereof a retaining hole which is provided peripherally with a plurality of ventilation holes;

a soft disk member having a disk portion and a retaining column engageable with said retaining hole of said large cavity of said lid, said disk portion intended for covering said ventilation holes of said retaining hole; and a suction unit fastened to said lid and provided with a lever and a suction block, said lever being fastened pivotally at one end thereof to said lid and provided at a midsegment thereof with said suction block pivoted thereto, said lever further being provided at another end thereof with a hand grip, said suction block comprising a rod fastened pivotally at one end thereof to said lever and provided at another end thereof with a piston slidable along a wall surface of said large cavity, said piston provided peripherally with a circular groove dimensioned to receive therein a sealing ring, said piston further provided in an edge of an upper surface thereof with at least one indentation;

wherein said large cavity is provided on a top edge thereof with a circular wall having on an outer surface thereof a plurality of male threads engageable with female threads of a sealing cover which is provided centrally with an insertion hole engageable with said suction block.

2. The vacuum canister as defined in claim 1, wherein said lid is provided with a small cavity having in a bottom thereof a retaining hole which is provided peripherally with a plurality of ventilation holes, said small cavity of said lid being so dimensioned as to receive therein a press button urged by said soft disk member engageable with said retaining hole of said small slot, said press button having a press rod provided with a press disk which can be pressed with hand.

3. The vacuum canister as defined in claim 1, wherein said lid is provided with a hooked block having a shallow groove; and wherein said hand grip of said lever is provided with a hoop dimensioned and shaped to be received in said shallow groove of said hooked block.

\* \* \* \* \*